US005594060A

United States Patent [19]
Alig et al.

[11] Patent Number: 5,594,060
[45] Date of Patent: Jan. 14, 1997

[54] VAPOR GROWN CARBON FIBERS WITH INCREASED BULK DENSITY AND METHOD FOR MAKING SAME

[75] Inventors: Robert L. Alig, Dayton; Jason R. Guth; David J. Burton, both of Fairborn, all of Ohio

[73] Assignee: Applied Sciences, Inc., Cedarville, Ohio

[21] Appl. No.: 480,246

[22] Filed: Jun. 7, 1995

Related U.S. Application Data

[63] Continuation-in-part of Ser. No. 276,434, Jul. 18, 1994, abandoned.

[51] Int. Cl.$^6$ ............................... C08K 3/04; B32B 5/16
[52] U.S. Cl. ........................ 524/496; 524/495; 523/204; 523/205; 428/244; 423/448
[58] Field of Search ..................... 524/496, 495; 523/204, 205; 428/244; 423/448

[56] References Cited

U.S. PATENT DOCUMENTS

| | | | |
|---|---|---|---|
| 1,957,314 | 5/1934 | Billings et al. | 134/60 |
| 2,375,796 | 5/1945 | Krejci | 23/209.6 |
| 2,500,968 | 3/1950 | Venuto | 23/314 |
| 4,328,151 | 5/1982 | Robinson | 524/495 |
| 4,375,497 | 3/1983 | Sandstrom | 524/525 |
| 4,474,906 | 10/1984 | Nakama et al. | 523/205 |
| 4,578,411 | 3/1986 | Budd et al. | 524/496 |
| 4,855,122 | 8/1989 | Kitamura et al. | 423/447.1 |
| 4,999,244 | 3/1991 | Morimoto | 524/496 |
| 5,028,482 | 2/1991 | Jeffs | 523/205 |
| 5,171,489 | 12/1992 | Hirao et al. | 264/8 |
| 5,374,415 | 12/1994 | Alig et al. | 423/447.3 |
| 5,433,906 | 7/1995 | Dasch et al. | 264/117 |

*Primary Examiner*—Paul R. Michl
*Assistant Examiner*—Olga Asinovsky
*Attorney, Agent, or Firm*—Killworth, Gottman, Hagan & Schaeff

[57] ABSTRACT

Carbon fiber with increased bulk density comprising vapor grown carbon fiber is provided. The preferred method of increasing the carbon fiber bulk density comprises mixing a vapor grown carbon fiber with a diameter of less than about 1 μm and an initial bulk density of less than about 0.2 lb/ft$^3$ with an aqueous-based solution, blending the mixture under high shear conditions, and drying the blended mixture. Upon drying, the mixture forms a carbon fiber mass with an increased bulk density having a final bulk density of at least about 3 lb/ft$^3$. The increased bulk density carbon fiber pellets are ideally suited for use as reinforcing materials in rubber, plastic and the like. Preferably, the aqueous-based solution is a latex containing solution and latex is deposited on the fibers.

20 Claims, 3 Drawing Sheets

STRESS / STRAIN EVALUATIONS OF 45 PARTS N299 GPT CARBON BLACK IN 100 PARTS SBR RUBBER

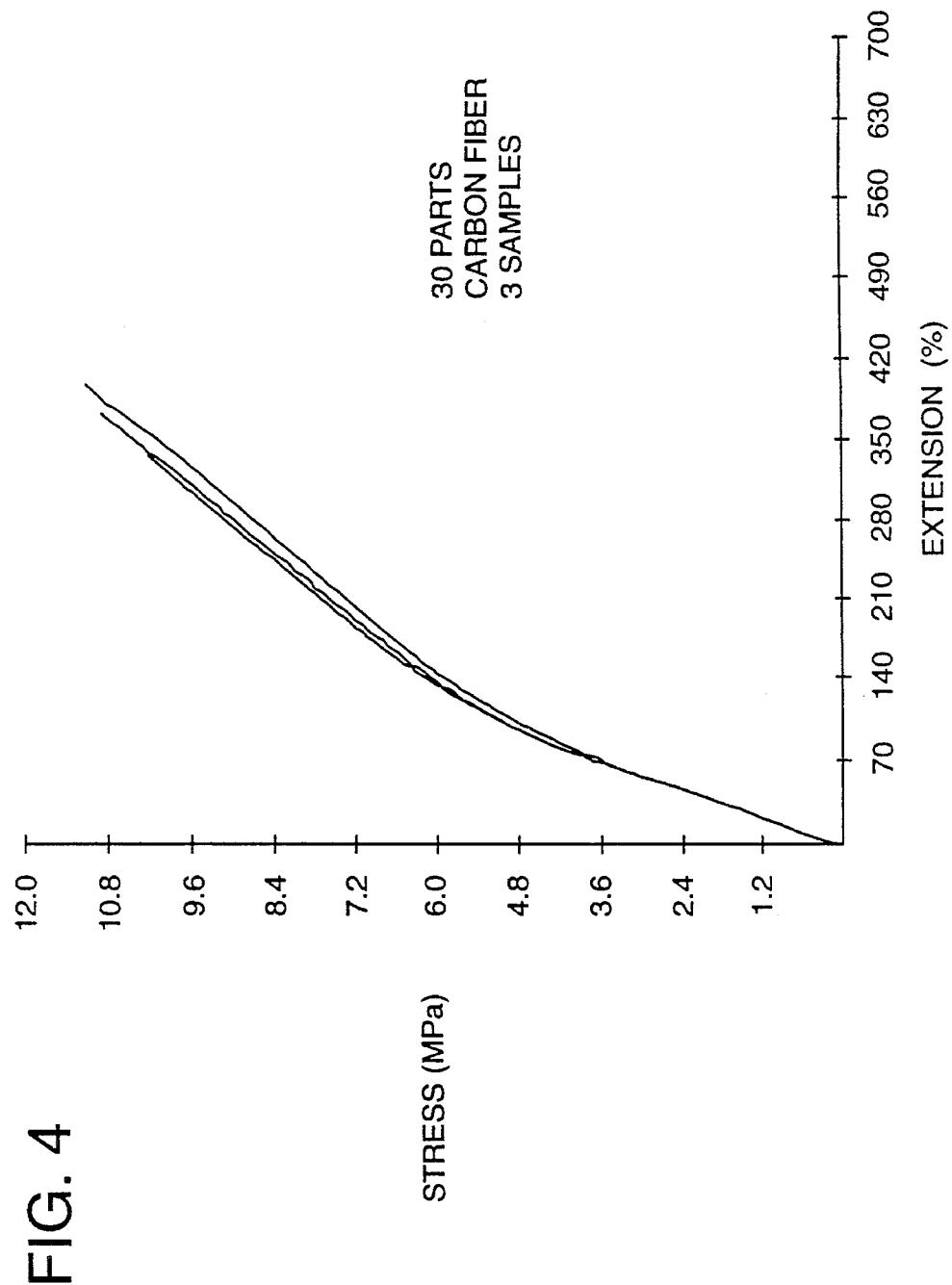

VAPOR GROWN CARBON FIBERS WITH INCREASED BULK DENSITY AND METHOD FOR MAKING SAME

This application is a continuation-in-part of prior U.S. patent application Ser. No. 08/276,434 filed Jul. 18, 1994, now abandoned.

BACKGROUND OF THE INVENTION

The present invention relates to vapor grown carbon fibers having increased bulk density and to the method of increasing such bulk density.

Commercial carbon fibers hold great promise as a high-performance material for composites due to their high strength and high modulus. They are commonly made by elevating a precursor material such as polyacrylonitrile (PAN) or pitch in an inert atmosphere to a temperature around 1000° C. on continuous wind-up devices. They are generally continuous filaments and approximately 8 μm diameter.

However, this application is concerned with vapor grown carbon fibers that are a recent entry in the field of carbon fibers and have similar or even superior physical properties along with the potential for production at a lower cost. Vapor grown carbon fibers are produced directly from hydrocarbons such as methane in a gas phase reaction upon contact with a catalytic metal particle around 1000° C. in a non-oxidizing gas stream. U.S. Pat. No. 5,024,818 to Tibbetts et al. and U.S. Pat. No. 5,374,415 to Alig et al describe typical reaction processes and chambers. Vapor grown carbon fibers differ substantially from commercial carbon fiber in that the fibers are not continuous. The length is around 0.001 to 0.04 mm and the fibers exist as an entangled mass as shown in FIG. 1.

More importantly and pertinent to this application is that the fiber diameter of a vapor grown carbon fiber is generally under 1μ and 0.2μ is a common average. As those familiar with the growth of vapor grown carbon fibers know, these fibers can be subsequently thickened to the diameter of commercial fibers. However, this can be rather expensive and the resulting fibers are not as graphitic as the original filament graphitization ultimately characterizes the strength and modulus of the fiber. Thus, it is desirable to use fibers that are smaller than the diameter of a commercial fiber by a factor of 40. In terms of surface area, one gram of commercial fiber, which must be considered for coating and bonding to a plastic or rubber matrix, covers about 5.4 ft$^2$, whereas the surface area of one gram of the entangled mass of vapor grown carbon fibers occupies about 108 ft$^2$. In other words, 20 times as much coating must be applied to the vapor grown carbon fiber to achieve an equivalent coating thickness. In spite of this obstacle, this presents an opportunity for tremendous potential for rubber and plastic reinforcement.

Further, as these vapor grown carbon fibers are much finer than their continuously grown counterparts, the fibers exist upon leaving the reactor as an entangled mass that is very lightweight with a large apparent volume, from 5 to 50 ft$^3$/lb. In other words, the fibers are a lightweight, fluffy entangled mass. In this state, the fibers are very difficult to ship and handle. Such a light and fluffy material is almost impossible to incorporate into mixing equipment that typically processes rubber or plastic. The fly loss and incorporation time is tremendous. Due to a low surface tension, the fibers can not be easily wetted out or mixed into liquid applications without prior surface treatments. These problems represent a severe limitation on the use of vapor grown carbon fibers as they can not be readily dispersed into rubbers, plastics or the like. Thus, the development of methods by which the vapor grown carbon fibers are wet out and densified are key to the commercialization of these materials.

U.S. Pat. No. 5,171,489 to Hirao et al discloses a method for producing composite fibers for electrical conductive applications by combining vapor grown carbon fibers with solid resin particles and heating to form a molten polymer, extruding the mixture from a high speed centrifuge to form filaments, blowing hot gas onto the filaments to form a composite, and subsequently graphitizing by a further heat treatment. However, Hirao et al do not teach a high final bulk density nor do they teach the use of a latex liquid system to enhance adhesion in rubber or like materials. Further, Hirao et al require an additional heat treatment. This additional heat treatment drives off any remaining nitrogen or oxygen groups from the surface of the fibers. Nitrogen and oxygen groups on the surface of the fiber enhance adhesion of subsequent materials with which the fibers are blended.

U.S. Pat. No. 4,855,122 to Kitamura et al discloses a method for increasing the bulk density of carbon fibers. In Kitamura et al, carbon fibers are dipped in an inorganic or organic binder and then dried. The final bulk density of the fibers is from 0.2–0.8 g/cm$^3$. However, Kitamura et al use carbon fibers from traditional PAN processes which are, in general, much thicker than vapor grown carbon fibers. Further, Kitamura does not blend the fibers and the product has a relatively low final bulk density.

Accordingly, there remains a need for increasing the bulk density of fine carbon fibers and pelletizing such fibers, particularly vapor grown carbon fibers, as well as increasing their adhesion in rubbers, plastics and like materials.

SUMMARY OF THE INVENTION

This need is met by the present invention whereby vapor grown carbon fibers with increased bulk density and a method for making the same is provided. The carbon fiber of the present invention is a vapor grown carbon fiber. Preferably, a latex film is deposited on the vapor grown carbon fibers. The latex film assists the fine carbon fibers into forming a more dense mass, such as pellets or the like, than is possible of the carbon fibers in an uncoated state. Latex polymers uniquely coalesces onto the surface of the fibers and the polymer type can be appropriately selected to provide improved adhesion between the carbon fibers and rubbers, plastics or any material in which the fibers are incorporated.

In accordance with the present invention, there is provided a method for increasing the bulk density of vapor grown carbon fibers comprising mixing a quantity of vapor grown carbon fibers having an average diameter of less than about 1 μm and an initial bulk density of less than about 0.2 lb/ft$^3$ with an aqueous-based solution, stabilizing and blending the mixture to uniformly disperse the vapor grown carbon fibers in the solution and drying the mixture to form a mass of carbon fibers which has a final bulk density of at least about 3 lb/ft$^3$, preferably of at least about 10 lb/ft$^3$. The mass of carbon fibers can be in the form of cakes, pellets, or sheets. The vapor grown carbon fibers of the present invention preferably have a diameter in the range of about 0.02 μm to about 0.8 μm, and more preferably 0.2 μm. Preferably the initial bulk density is within the range of about 0.1 to about 0.02 lb/ft$^3$.

Preferably, the aqueous-based solution is a latex-containing solution. The latex can be any latex compound either synthetic or preferably a natural rubber latex. Additionally, a surfactant can be added to aid in wetting-out or coating the carbon fibers and stabilizing the latex. Many surfactants may be employed. However, the surfactant is preferably a non-ionic surfactant. Further, additional water may be added to the mixture of carbon fiber and latex to aid in blending. The blending is preferably conducted under high shear conditions. The high shear blending is preferably performed at a speed of at least about 10 m/sec. Since latex is basically a polymer suspension in water and sometimes blended in solvents, the high shear mixing in itself may cause the polymer suspension to settle out or gel into a solid mass. Consequently, the surfactant is added in an amount that assures that the latex can withstand the high shear mix and not settle out if it were to be mixed without the presence of carbon fiber. Thus, when the fibers, latex, surfactant, and water are mixed the latex polymer does not settle out as a separate entity in the mixture, but as a coating on the surface of the carbon fiber. Furthermore, the preferred unthickened, highly graphitic, vapor grown carbon fiber is of such a great magnitude of strength that it can withstand the high shear mix without pulverizing and thus losing its reinforcement capabilities.

In accordance with an additional aspect of the present invention, there is also provided the product of the above mentioned pelletizing process. The product is a carbon fiber/latex blend comprising vapor grown carbon fibers having a diameter of less than about 1 μm and an initial bulk density of less than about 0.2 lb/ft$^3$ blended with a latex to form a mass of carbon fibers with latex polymer deposited on the surface and having a final bulk density fiber/latex blend of at least about 3 lb/ft$^3$. Again, the blend can be in the form of pellets.

The carbon fibers are vapor grown carbon fibers. The average diameter of the carbon fibers is preferably in the range of about 0.02 μm to about 0.8 μm, and more preferably about 0.2 μm. The initial bulk density of the carbon fibers is preferably within the range of about 0.1 to about 0.02 lb/ft$^3$ and the latex film is preferably a natural rubber latex.

The pelletized carbon fiber/latex blend of the present invention may be incorporated or blended into any product in which carbon fiber reinforcement is desired, such as, for example, rubbers, plastics and car body panels. Particularly, the pelletized carbon fiber/latex blend of the present invention is useful as a reinforcing material in rubber tires.

Accordingly, it is an object of the present invention to provide carbon fiber/latex blend comprising a vapor grown carbon fiber blended with a latex. It is further an object of the present invention to provide a method for increasing the bulk density of vapor grown carbon fibers by blending the carbon fibers with an aqueous-based solution and drying to form a mass of carbon fibers. These, and other objects and advantages of the present invention will become apparent from the following detailed description, the accompanying drawings, and the appended claims.

BRIEF DESCRIPTION OF THE DRAWINGS

FIG. 4 is a graph of stress/strain evaluation of the latex coated carbon fiber according to the present invention in rubber.

DETAILED DESCRIPTION OF THE PREFERRED EMBODIMENTS

Figure 1:
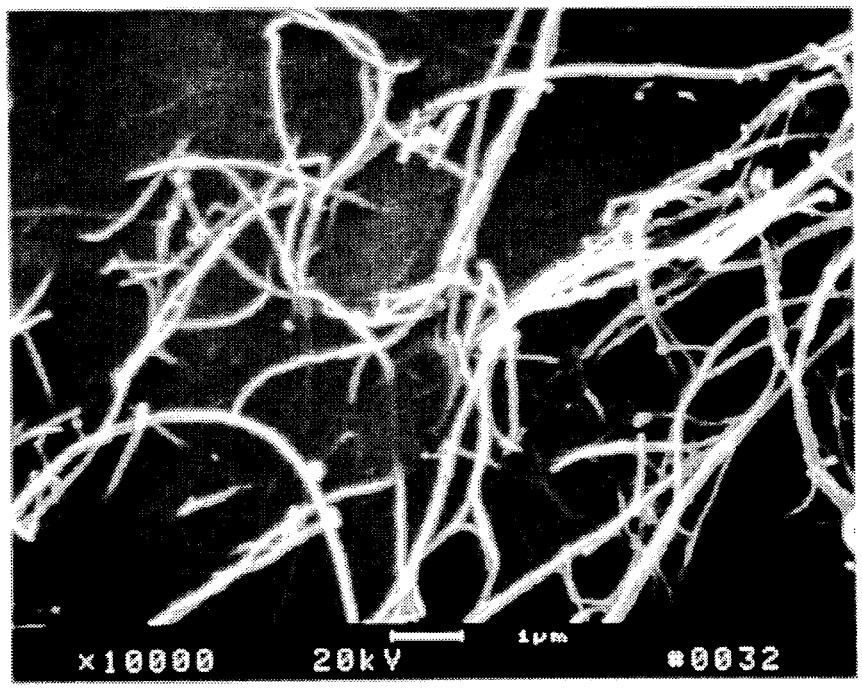
FIG. 1 is a photomicrograph of vapor grown carbon fibers of the present invention.

The method of the present invention relates to the conversion of vapor grown carbon fibers into a form that can be readily employed in commercial applications. Vapor grown carbon fibers generally exist as an entangled mass as shown in FIG. 1. Such vapor grown carbon fibers have a large apparent volume, large surface area, and a low surface tension. As a result, the fibers are too fluffy to handle, difficult to mix, and do not "wet-out" easily with polymers. The fibers actually tend to repel liquids rather than be wetted out. This severely limits the commercial application of such carbon fibers in liquid based processes such as those employing rubber, plastic or the like.

Thus, in order to be successfully employed in many commercial applications, the surface tension must be raised and apparent volume of these vapor grown carbon fibers must be reduced. This is achieved by the method of the present invention whereby vapor grown carbon fibers are mixed with an aqueous-based solution, blended and dried. The bulk density of the carbon fibers is increased, thereby reducing the apparent volume, creating denser masses of carbon fibers which may be in the form of pellets. As the pellets are not formally shaped before drying they may assume many different shapes and sizes. Furthermore, by "pellets" in the present application, it is intended to mean dense individual masses not necessarily of uniform shape or size.

The vapor grown carbon fibers of the present invention should be a graphitic carbon fiber. The graphitic carbon fibers used in the present invention are ones having an average diameter of below about 1 μm, preferably one having a diameter in the range of about 0.02 μm to about 0.8 μm, and more preferably about 0.2 μm. Additionally, the vapor grown carbon fibers of the present invention should have a bulk density (the inverse of specific volume) of below about 0.2 lb/ft$^3$, preferably in the range of about 0.1 to about 0.02 lb/ft$^3$. The graphitic fibers provide the capability of superior reinforcement as compared to commercial carbon black and the resulting tremendous surface area of the smaller diameter provides the potential for better bonding between the polymer and the fiber.

Vapor grown carbon fibers are produced by a vapor deposition process. One such particularly suitable process for producing vapor grown carbon fibers for use in the present invention is disclosed in U.S. Pat. No. 5,374,415 to Alig et al the disclosure of which is herein incorporated by reference. Metallic particles, such as from iron pentacarbonyl, are placed in a vapor chamber and catalyze the growth of long, slender graphitic filaments when exposed to a hydrocarbon gas such as methane, hydrogen sulfide and ammonia in a temperature greater than about 1000° C. with an intermittent oxygen in air purge to remove the carbon fiber in the reactor.

The vapor grown carbon fibers of the present invention are employed in the blending process as produced. The use of ammonia and an air purge as in the preferred method of manufacture for the carbon fiber provides a surface treatment for the vapor grown carbon fiber. The use of air at the high temperatures within the reaction chamber develops an oxidative treatment on the vapor grown carbon fiber surface produced. However, as the air purge is intermittent, the oxidative treatment is not excessive to the point where etching or pitting of the carbon fiber surface occurs to any substantial amount. On the other hand, the use of an ammonia gas in the reactor deposits active nitrogen groups on the carbon fiber surface. Preferably, about 4% nitrogen groups are deposited on the fiber surface.

Hydrogen sulfide may be needed for the abundant fiber formation and as it enhances the fiber growth from the iron catalyst and remains with the fiber. Thus, for abundant fiber formation, hydrogen sulfide addition is preferred. The ammonia, air, and sulfur used in the reaction during formation provides sites on the fiber and can be adjusted and tailored depending upon the desired end use.

Thus, the carbon fibers produced according to the preferred method of manufacture disclosed above, includes oxygen, sulfur, and nitrogen groups on the fiber surface. While not wishing to be bound by any one theory of operation of the present invention, it is believed that the nitrogen and oxygen groups on the fiber surface enhance the fiber surface's ability to wet-out and/or form bonds with other materials, while the sulfur can be a part of the vulcanization of rubber. Accordingly, the deposition or coating of latex on the carbon fiber surface is enhanced by the activated fiber surface.

An additional heat treatment step at higher temperatures and/or additional thickening for longer times is not required. That is, the preferred vapor grown carbon fiber of the present invention has not been subjected to a thickening process or subsequent heat treatment for higher graphitization.

The dense mass of carbon fiber of the present invention is produced by mixing carbon fibers with an aqueous-based solution and blending until the carbon fibers are completely wetted-out in the solution. The aqueous-based solution may be water but may be other aqueous-based solutions, such as latex. The latex of the present invention can be any latex material. Preferably, the latex to be used is a natural rubber latex solution. However, synthetic latex solutions are also within the scope of the invention. Preferably, the vapor grown carbon fibers are mixed with the latex solution in such a quantity to provide from about 1% to about 50% by weight of a latex coating on the carbon fibers. More preferably, from about 1% to about 25% by weight of a latex coating is provided on the carbon fibers and most preferably from about 3% to 7% by weight.

A surfactant or wetting agent may also be added to the mixture. A surfactant or wetting agent functions to raise the surface tension and in addition stabilizes and is capable of maintaining the latex polymer in suspension while withstanding the shear of mixing. The intent is for the latex polymer to coalesce on the surface of the carbon fiber and not separate. The surfactant may be any compound suitable for the purpose of aiding wetability and maintaining the latex suspension. Preferably, the surfactant is a nonionic surfactant.

Once the carbon fibers and aqueous-based solution are combined, the mixture is blended in order to disperse the carbon fibers in the solution. The mixture is blended until the carbon fibers have been substantially wetted-out in the solution. If a latex solution is employed, the carbon fibers are wetted-out or coated by the latex solution. Before processing, latex exists as an emulsion of natural or synthetic rubber compounds in an aqueous solution. During high shear mixing, upon addition of the fibers the latex goes out of solution, i.e. gels or coagulates, thereby coating the carbon fibers with a thin film of latex. Additional water may be added either before or during blending to aid in the blending of the carbon fiber.

The blending must be sufficiently fast enough such that the carbon fibers are wetted-out in the aqueous-based solution. The blending causes the preferred latex to evenly disperse and coalesce or deposit on the surface of the carbon fibers. Thus, a high shear or high speed blending is preferred in the present invention. By high shear or high speed it is intended to be for the purposes of this invention, a blending process that rotates at approximately 5 m/s or above. The rotation is preferably above 10 m/s, more preferably above approximately 40 m/s, and most preferably approximately 100 m/s. The mixture is blended for a period of time sufficient to wet-out or coat the carbon fibers with the aqueous-based solution. Thus, the approximate blending time will depend on the amount of added carbon fibers and the size of the blending apparatus.

For an economically feasible process, it is generally desirable to filter the mixture through a filter such as a screen or fiber glass cloth and drying the remaining cake while the liquid is discarded. For a quality control check on the latex stability, a sample of the liquid can be weighed, dried, and re-weighed to assure that the latex polymer has coalesced on the fiber and not in the discard liquid. For end uses such as sheet molded automotive body panel applications or where subsequent chemical vapor deposition is desired, the wet cake can be spread or drawn out by a knife blade process into thin paper-like sheets, gravity or vacuum filtered, and then dried. For most applications, the caked mass can be dried and used or broken into pellets for easier handling.

In the process of forming the fiber in the reactor, there are times when it is known that undesirable soot, ash, etc. are present with the fiber. In this situation the surfactant level can be adjusted upward while mixing or excess water can be flushed through the cake and the undesirables will separate from the cake during filtration, thus purifying the fiber and latex polymer for drying and pelletization.

After blending for a sufficient length of time, the carbon fibers are dried. The drying process may be conducted by decanting, filtering, or any heating procedure suitable for the purpose. However, if the drying process chosen is one involving an elevated temperature, the temperature should be kept below approximately 60° C. with high air flow, but could go to approximately 105° C. for short periods of time. This temperature is low in order to preserve the vulcanization capability of the natural rubber or polyisoprene coating. Other rubber or plastic polymer structures could withstand higher temperatures as appropriate.

Upon drying, the carbon fibers form relatively small, dense masses, such as beads, chips or pellets. Pellets are particularly desirable for shipment and for ease of incorporation into processing equipment. For some end uses such as where high thermal or electrical conductivity is the goal, it is desirable to form a densified thin sheet or pelletized product with no latex sizing whatsoever. In this case, the process can be carried out exactly as described except without any latex and the pellets will have a density in the 1–10 lb/ft$_3$ range and still be adequate for incorporation into processing equipment. These pellets should have a final bulk density of at least about 3 lb/ft$^3$. Preferably, the pellets of carbon fiber will have a final bulk density of at least about 10 lb/ft$^3$. This represents a bulk density increase from untreated carbon fibers to carbon fiber/latex blend of at least about 30 times and more preferably of at least about 500 times.

The mass of vapor grown carbon fibers of the present invention is ideally suited for incorporation as a reinforcing agent into material such as rubber, plastic and the like. The blend enhances the carbon fibers ability to be incorporated into liquid systems by reducing the apparent volume of the fiber and increasing the surface tension. Further, the preferred latex coating on the fibers enhance the carbon fibers ability to adhere to the rubber or plastic compounds into which they are blended.

Figure 2:
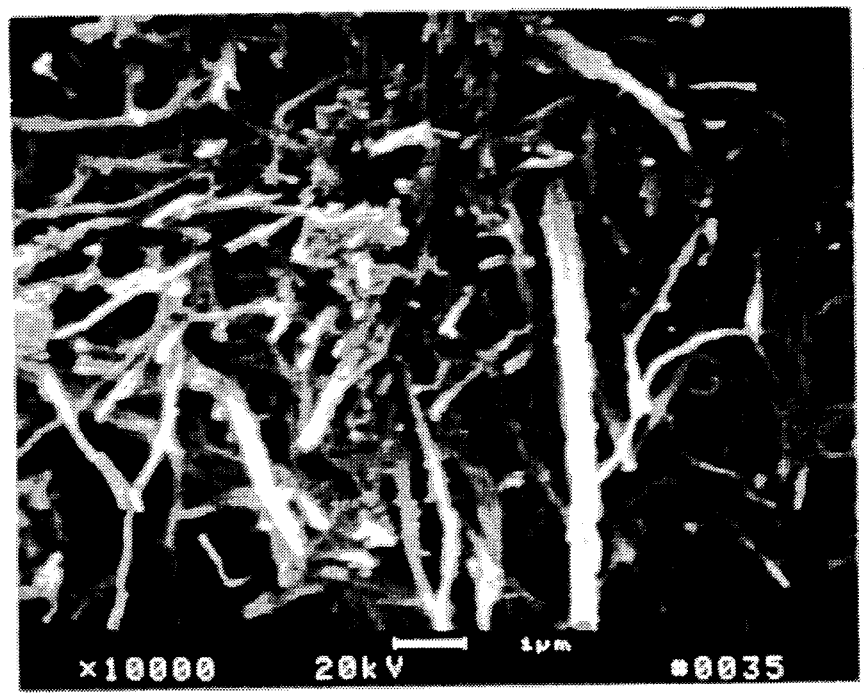
FIG. 2 is a photomicrograph of a pelletized carbon fiber/latex blend according to the present invention.

Additionally, due to the high degree of graphitization of the vapor grown carbon fibers, the blending procedure of the present invention, contrary to reason, does not break or shatter the carbon fibers. While a high shear blending would be expected to break or shatter fine diameter fibers, this is not the case in the present invention. Rather, the fibers length integrity is maintained. Maintaining length integrity of the fibers is particularly important when the fibers are to be employed as reinforcing materials. In order to gain maximum benefit of strength and modulus, the fibers length must remain intact. The carbon fibers of the present invention can be seen in FIG. 2. FIG. 2 is a photomicrograph of a mass latex coated carbon fiber of the present invention. As can be seen, the latex coated carbon fibers have maintained their length integrity, even after blending, from pre-processed carbon fiber depicted in FIG. 1.

The method of the present invention will now be illustrated by reference to an example. The method is not intended to be limited to the specific, exemplary materials below, but, rather, may be practiced generally by the principles espoused below.

EXAMPLE 1

10.5 grams of vapor grown carbon fibers having an average diameter of approximately 0.2 µm and initial bulk density 0.044 lb/ft$^3$ was mixed with 0.91 grams of a natural rubber latex solution having a rubber content of 61%, 0.5 grams of a nonionic surfactant, T-DET (n 9.5) from Harcos Chemical, Inc. and 400 milliliters of water. The mixture was blended in a high shear blender for 10 minutes at 12 m/sec. During blending, the latex gelled from solution onto the fibers. Upon drying, the mixture forms a mass of carbon fibers with latex polymer deposited on the surface in pelletized form. The final bulk density was approximately 11.2 lb/ft$^3$. This represents an increase in bulk density of untreated carbon fiber to latex coated carbon fiber by a factor of 250.

EXAMPLE 2

26.4 gallons of water were combined with 0.22 lb of nonionic surfactant, T-DET (N-9.5) and 0.4 lb of low ammonia natural rubber latex with a 61% dry rubber content in a 55 gallon drum, the mixture had a gray-white opaque color. The mixture was briefly stirred at low speed on a Cowles Dissolver type mixer using a standard 6 inch circular blade with knife-sharp protruding tips on the circumference—designed for high shear dispersion and pumping action. 4.65 lb of vapor grown carbon fibers were gradually added; then mixed for 15 minutes at 5000 rpm (40 m/sec) until a thorough mix was obvious. The mixture was decanted, vacuum filtered, and dried in high air flow around 60° C. The decanted filtrate was a clear liquid that upon drying deposited no residual polymer. The resulting chips had a density of 20 lb/ft$^3$.

EXAMPLE 3

The treatments on the vapor grown carbon fiber (VGCF) during processing make subsequent successful polymer bonding feasible at a minimum cost. A windshield wiper blade formulation of natural rubber containing 28% by wt. of commercial type "N650" carbon black is compared with identical loadings of vapor grown carbon fiber (VGCF) with processing conditions altered as follows:

| NATURAL RUBBER MIX | | | |
|---|---|---|---|
| | TENSILE PSI | ELONG % | YOUNGS MODULUS |
| COMMERCIAL N-650 BLACK COMPOUND | 1453 | 203 | 1008 |
| VGCF USING INERT HELIUM ONLY | 1950 | 405 | 780 |
| VGCF USING AIR (NO AMMONIA) | 1625 | 155 | 1990 |
| VGCF MADE WITH AIR & AMMONIA | 1700 | 134 | 2554 |

Sulfur is needed in the process and was constant in each VCGF trial. All four formulations were tested by pulling the rubber sample to rupture. The stress is monitored while sample is elongated (strain) and the Youngs modulus is the stress/strain ratio during the early linear period of the sample undergoing stretch. The data shows that there is a dramatic modulus increase effected by injecting ammonia and subsequently air into the reaction that is superior to commercial carbon black. Although the fiber surface is enhanced for wet-out and/or bond formation during processing, the fiber for these trials was very difficult to mix due to the tremendous apparent volume/lb (10 to 50 ft$^3$/lb) and cannot be easily handled on a commercial basis.

EXAMPLE 4

Figure 3:
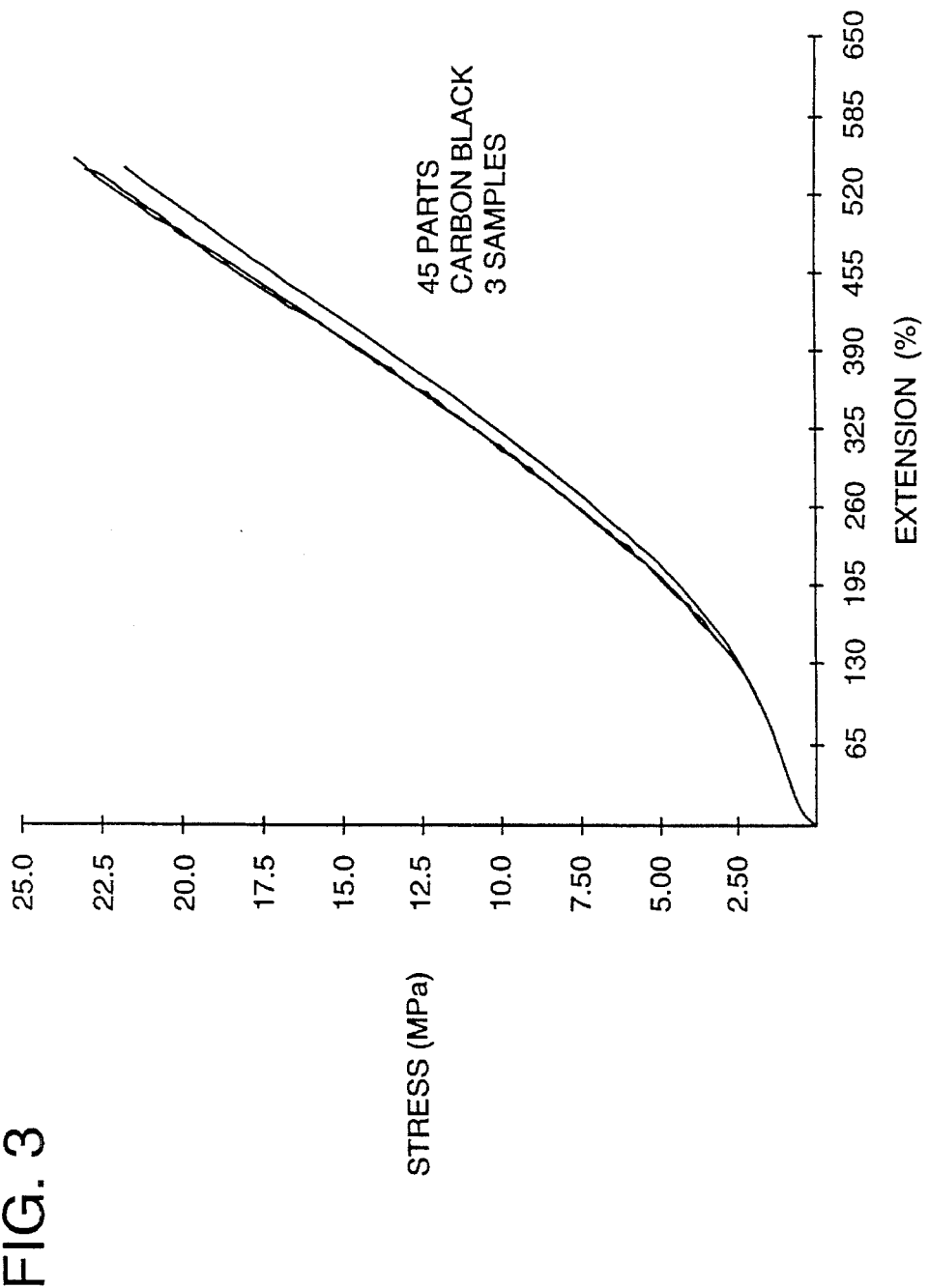
FIG. 3 is a graph of stress/strain evaluation of carbon black in rubber.

VGCF was produced with air and ammonia and pelletized to the 10 lb/ft$^3$ range with a 5% dry rubber by weight of natural rubber latex to enhance the bonding capability. The sample was evaluated at one-third the loading level of a typical carbon black (A.S.T.M. designation: N 299 GPT black) and still attained a modulus 2.5 times greater than that of the carbon black at a 70% extension as shown in FIGS. 3 and 4. Thus, through a combination of fiber surface treatment during production, latex sizing application, and pelletization it is possible to achieve a stiffening in rubber that is superior to the capability of carbon black.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for increasing the bulk density and reinforcement capability of vapor grown carbon fibers comprising:

mixing a quantity of vapor grown carbon fiber which have been surface treated during formation and which have an average diameter of less than about 1 µm and an initial bulk density of less than about 0.2 lb/ft$^3$ with an aqueous-based solution containing a latex;

blending said mixture to evenly disperse said carbon fibers in said aqueous solution and to deposit said latex on said carbon fibers; and, drying said blended mixture to form a mass of carbon fibers whereupon drying said mass of carbon fiber has a final bulk density of at least about 3 lb/ft$^3$.

2. The method as claimed in claim 1 wherein said carbon fibers have an average diameter in the range of about 0.02 µm to about 0.8 µm.

3. The method as claimed in claim 2 wherein said carbon fibers have an average diameter of about 0.2 μm.

4. The method as claimed in claim 1 wherein said initial bulk density is within the range of about 0.1 to about 0.02 lb/ft³.

5. The method as claimed in claim 1 wherein said latex is a natural rubber latex.

6. The method as claimed in claim 1 wherein said mixture further includes a surfactant.

7. The method as claimed in claim 1 including the step of adding additional water to the mixture.

8. The method as claimed in claim 1 wherein said blending is a high shear blending.

9. The method as claimed in claim 8 wherein said high shear blending is performed at a speed of at least about 10 m/sec.

10. The method as claimed in claim 1 wherein said final bulk density of said mass of carbon fibers with latex polymer deposited on the surface is at least about 10 lb/ft³.

11. The method as claimed in claim 1 wherein said latex deposited on said carbon fibers comprises from about 3 to about 7% by weight of said mass of latex deposited carbon fibers.

12. A carbon fiber/latex blend comprising:

vapor grown carbon fibers having an average diameter of less than about 1 μm and an initial bulk density of less than about 0.5 lb/ft³; and, a latex blended with said carbon fibers to form a mass of carbon fibers with latex polymer deposited on the surface which has the final bulk density of at least about 3 lb/ft³.

13. The blend as claimed in claim 12 wherein said carbon fibers have an average diameter in the range of about 0.02 μm to about 0.8 μm.

14. The blend as claimed in claim 13 wherein said carbon fibers have an average diameter of about 0.2 μm.

15. The blend as claimed in claim 12 wherein said initial bulk density is within the range of about 0.1 to about 0.02 lb/ft³.

16. The blend as claimed in claim 12 wherein said latex is a natural rubber latex.

17. The blend as claimed in claim 12 wherein said latex film is deposited on said carbon fibers by the steps of mixing said carbon fibers with a latex containing solution, blending said mixture to evenly disperse said carbon fiber in said latex containing solution, and drying said blended mixture to form a mass of carbon fibers with latex polymer deposited on the surface.

18. The blend as claimed in claim 17 wherein said blending step includes blending under high shear conditions.

19. The blend as claimed in claim 12 wherein said final bulk density is at least about 10 lb/ft³.

20. The blend as claimed in claim 12 wherein said latex comprises from about 3 to about 7% by weight of said mass of latex deposited carbon fibers.

* * * * *